United States Patent [19]

Kotaki

[11] Patent Number: 5,303,368
[45] Date of Patent: Apr. 12, 1994

[54] DEAD LOCK PREVENTING METHOD FOR DATA BASE SYSTEM

[75] Inventor: Koji Kotaki, Tokyo, Japan

[73] Assignee: Kabushiki Kaisha Toshiba, Kawasaki, Japan

[21] Appl. No.: 486,352

[22] Filed: Feb. 28, 1990

[30] Foreign Application Priority Data

Feb. 28, 1989 [JP] Japan ................................. 1-47204

[51] Int. Cl.⁵ .......................................... G06F 12/00
[52] U.S. Cl. ..................................... 395/650; 395/600; 364/DIG. 1; 364/281.5; 364/282.1; 364/246.8
[58] Field of Search .................. 364/DIG. 1, DIG. 2; 395/650, 600

[56] References Cited

U.S. PATENT DOCUMENTS

| | | | |
|---|---|---|---|
| 4,494,193 | 1/1985 | Brahm et al. | 364/200 |
| 4,791,554 | 12/1988 | Hirota et al. | 364/200 |
| 4,881,166 | 11/1989 | Thompson et al. | 364/200 |
| 5,016,167 | 5/1991 | Nguyen et al. | 364/200 |
| 5,095,421 | 3/1992 | Freund | 395/650 |

FOREIGN PATENT DOCUMENTS 63-238741 10/1988 Japan .

Primary Examiner—Gareth D. Shaw
Assistant Examiner—Kakali Chaki
Attorney, Agent, or Firm—Oblon, Spivak, McClelland, Maier & Neustadt

[57] ABSTRACT

In a dead lock preventing method for a data base system, for preventing a dead lock from being generated when a plurality of work stations, each having a data base, connected to a transmission route, perform lock reservation requests and lock requests to access a data base file of a desired arbitrary work station, a data base system including arithmetic control unit, an internal memory unit (first memory unit) having a file lock reservation list, a file lock transaction list, and a file lock transaction waiting list, and an external memory unit (second memory unit) for forming a data base constituted by a plurality of files is prepared for each work station. This dead lock preventing method includes a list judgement step of giving, when the arithmetic control unit accepts the lock request after a certain work station outputs a lock reservation request from a certain transaction, a lock permission or a lock inhibition to the certain transaction in accordance with whether another transaction is registered in the file lock transaction list and the file lock reservation list, and an aggregation judgement step of obtaining, when it is judged in the list judgement step that another transaction is registered not in the lock transaction list but in the file lock reservation list, transaction aggregations from the file clock reservation list and the file lock transaction list, and sequentially checking whether the transaction aggregation of the file lock transaction list is a zero aggregation, thereby giving a lock permission or a lock inhibition to the certain transaction.

7 Claims, 8 Drawing Sheets

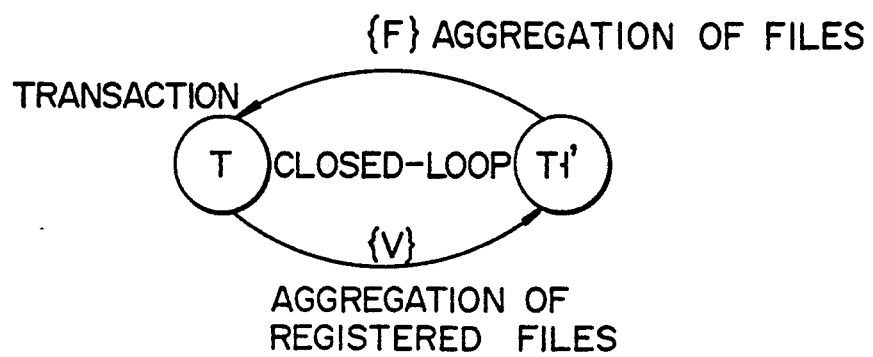
F I G. 2A
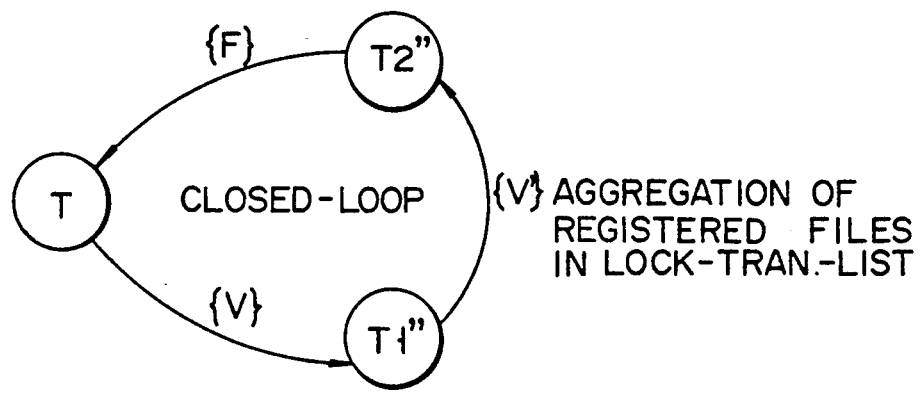
F I G. 2B
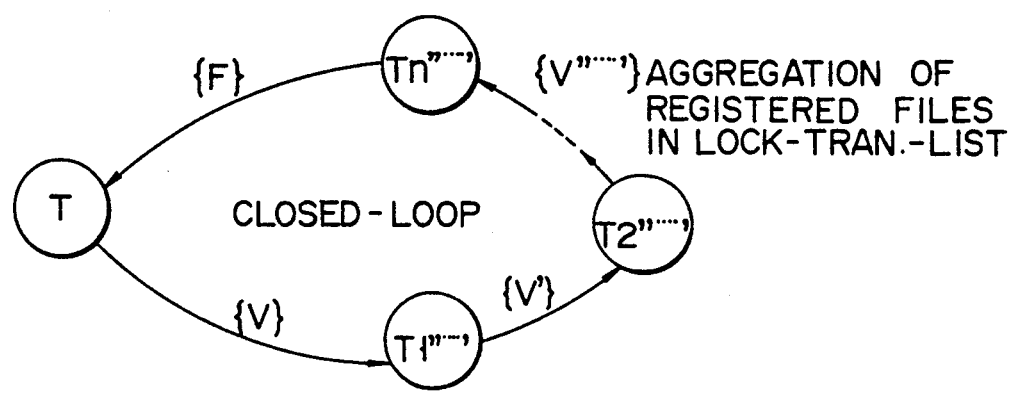
F I G. 2C

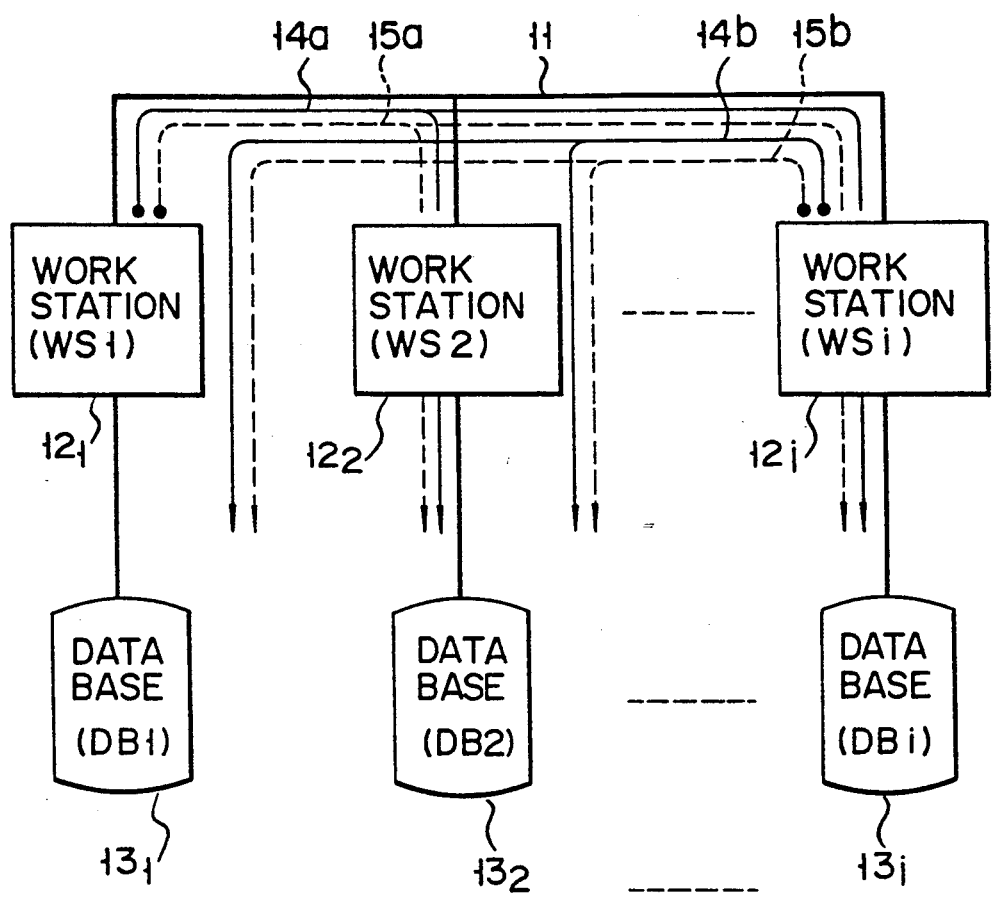
F I G. 3

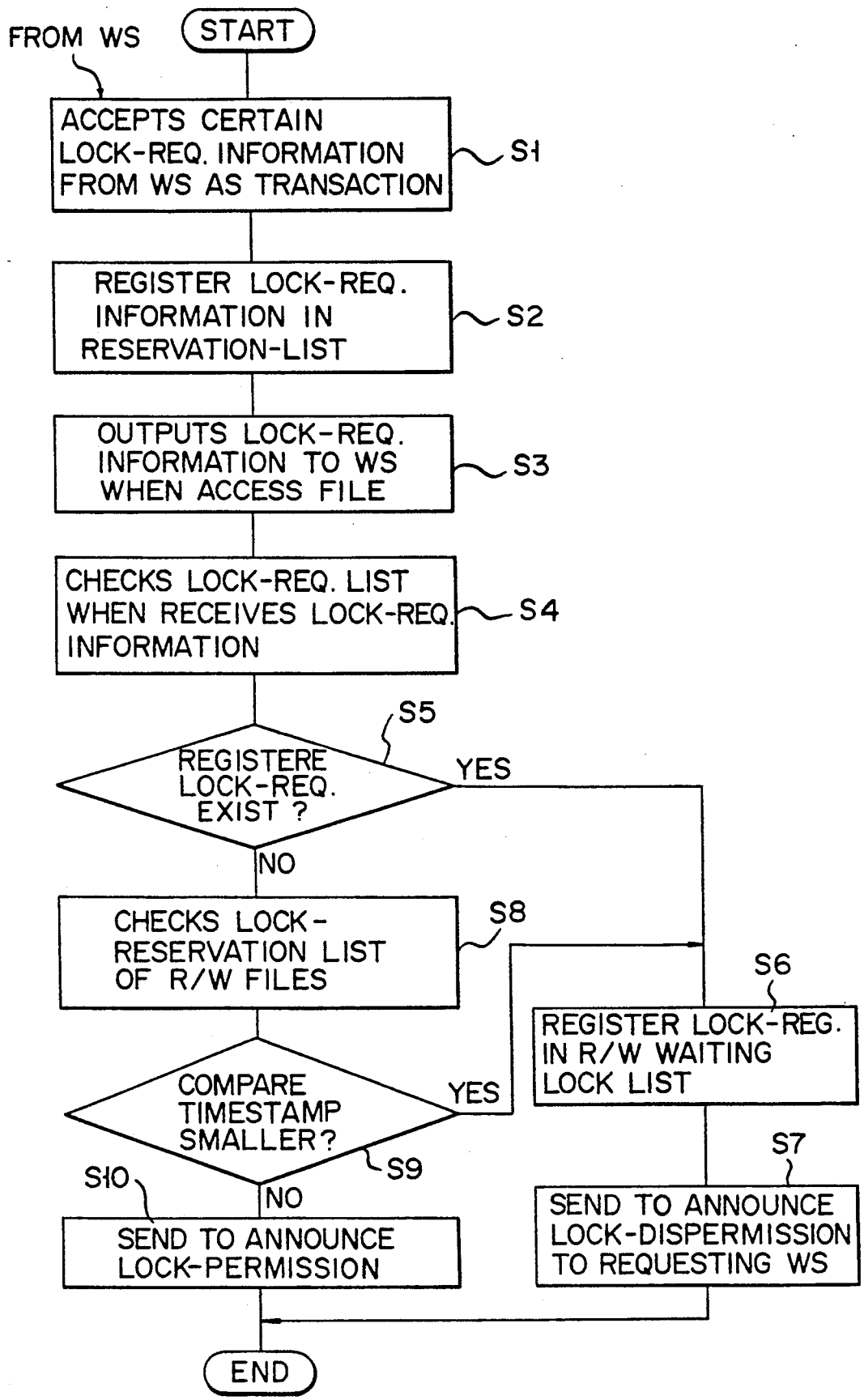
F I G. 10

DEAD LOCK PREVENTING METHOD FOR DATA BASE SYSTEM

BACKGROUND OF THE INVENTION

1. Field of the Invention

The present invention relates to a dead lock preventing method for a data base system, which can be used in the field of data searching control in, e.g., bank transactions, securities exchange, and medical examination facility and, more particularly, to a dead lock preventing method for a data base system, which can reliably prevent a dead lock that may be caused when a data base employed at one of a plurality of work stations (WS) arranged on a transmission route of a LAN (Local Area Network) is accessed by an arbitrary work station.

2. Description of the Related Art

In a distributed data-base-management-system (D-DBMS) in which a plurality of work stations (to be referred to as CPUs hereinafter) are distributed in a LAN and each CPU (i.e., a WS) independently has a data base, a plurality of data bases must be organically linked to each other to effectively utilize the data bases of the entire system. For this reason, serialization control is conventionally widely adopted to assure the same result of file updating between CPUs of WSs when an arbitrary CPU (WS) accesses a data base file employed in another CPU (WS) in order to perform data searching.

In addition, a prior art invention relevant to the present invention is disclosed in Published Unexamined European Patent Application No. 0278312. The following items will be described to explain one of typical conventional techniques.

(1) Serializability in file updating.
(2) General lock models for realizing the serialization control.
(3) A 2-phase lock as one of the lock models.
(4) Occurrence of a dead lock caused by the 2-phase lock.
(5) A time stamp method for eliminating the occurrence of a dead lock.

(1) Data serializability in file updating

Presume that transactions having data processing characteristics including read/write/excute for accessing a data base of a certain CPU (WS) are T1, T2, ..., Tm, unit data used by the transactions to perform read/write (R/W) are a, b, c, ..., z and read processing and write processing performed by a transaction Ti by using the unit data are $Ri(\alpha)$ and $Wi(\alpha)$, respectively. In this case, the transaction Ti is represented by the following equation:

$$Ti = Ri(\alpha) \cdot Wi(\alpha) \cdot \ldots \cdot Ri(\alpha) \cdot Wi(\alpha)$$

(where the value of $\alpha$ is an arbitrary value of $\{a, b, c, \ldots, z,\}$ of unit data to be accessed by the transaction Ti.)

Rules for obtaining the data serializability control in file updating are as follows.

①  Let a jth file access operation in the transaction Ti be represented by Tij.

②  Let a schedule (procedure step) of the transaction Ti be represented by $Ti = ti1 \cdot ti2 \cdot \ldots \cdot tij \cdot \ldots$ ③  Let a schedule of Tj be represented by $Tj = tj1 \cdot tj2 \cdot \ldots, tjk \cdot \ldots$ ④  Let a set of the transaction, concurrently processed, be represented by $\{T1, T2, \ldots, Tm\}$.

Then the data serializability in file updating is defined as follows on the basis of the above rules.

"In a transaction $T = T1, T2, \ldots, Tm = t11 \cdot t12 \cdot \ldots t21 \cdot \ldots t21 \cdot t22 \cdot \ldots tm1 \cdot tm2 \cdot \ldots$, let new transaction sequence obtained by arbitrarily rearranging the schedule be defined as $T' = t11' \cdot t12' \cdot \ldots t21' \cdot t22' \cdot \ldots \cdot tm1 \cdot tm2 \cdot \ldots$ Then, whatever type of data operation may be executed in the two contiguous schedules $tij \cdot tij+1$, the execution result of the above new transaction sequence undoubtedly coincides with one of execution results such that T1, T2 ... and Tm are rearranged and executed in a certain order.

In other words, a result obtained by a process such that a plurality of transactions randomly access data base files of required CPUs (WSs) coincides with one obtained by a process such that the same plurality of transactions sequentially access those data base files. It is a matter of course that the schedule aggregations $\{t11, t12, \ldots, tm1, tm2, \ldots\}$ $\{$and $t11', t12', \ldots tm1', tm2', \ldots\}$ are exactly identical except for an arrangement order.

Judgement on whether a schedule sequence selected arbitrarily in transaction ensembles to be processed concurrently might hold the data serializability rule in file updating is categorized a nonpolynomial complete problem (NP). That is, if the number of constituting factors of an event is N the number of events combined increases in proportion to degree of $2_{NN}$. So it is generally impossible to judge the serializability in real time processing. Therefore, a lock model processing rule is generally used in data serializability assurance.

(2) General lock models for realizing the serializability.

In brief, a lock model is a model in which the following declaration is made. That is, "when a certain transaction uses a data base file of an arbitrary CPU (WS), another transaction is prohibited to use the data base file (to be referred to as a lock declaration hereinafter)."

This model is based on the following theory.

In order to execute one schedule $Wi(\alpha)$ or $Ri(\alpha)$ in a certain transaction Ti, a lock declaration is made for data($\alpha$) to be accessed, and then $Wi(\alpha)$ or $Ri(\alpha)$ is executed. After $Wi(\alpha)$ or $Ri(\alpha)$ is processed, an unlock declaration is made for the data($\alpha$). With this rule, a judgement problem of the serializability can be represented not by the NP complete problem but by a polynomial problem algorithm and therefore can be resolved in real time.

Judgement of the serialization control executed using a lock model will be described below. A schedule sequence of a transaction Ti is generally represented by the following equation:

$$\begin{aligned} Ti &= Li(\alpha) \cdot Li(\alpha) \cdot \ldots \\ &\quad Ui(\alpha) \cdot Ui(\alpha) \cdot \ldots \\ &\quad Ui(\alpha) \cdot Ui(\alpha) \cdot \ldots \end{aligned}$$

(where $\alpha$ in ($\alpha$) is a unit of data to be accessed by the transaction Ti, Li is a lock declaration, and Ui is an unlock declaration.)

In the above equation, the number of lock declarations and the number of unlock declarations are equal to each other of course.

Next, a judgement of the serializability based on a lock model is executed according to the following producer.

① A directed graph related to a transaction schedule is drawn. A node Vi of the graph corresponds to processing one schedule of the transaction Ti.

② In the schedule, a node Vj is assigned to an operation Lj(a) (i≠j) which is performed first, following Ui(a) execution and a direction arrow (→) assigned with a label a directed from the node Vi to a node Vj is given. A a represents arbitrary unit data.

③ The above procedure is repeatedly performed to generate all possible arrows in the graph. Thereafter, if a closed-loop is formed as shown in FIG. 6, the serializability is failed. If an open loop is formed as shown in FIG. 7, the serializability is successful.

The reason is that, as shown in FIG. 6, resulting in the closed-loop means that the sequence of processing proceeded as follows, V1→V2→V3→V1 in time basis. As a result, the processing order between transaction T1 and T2 or T1 and T3, is not determined uniquely. This fact is against the definition of serializability.

These judgement rules give necessary and sufficient conditions for judging the serializability by using a lock model. By way of examples, the serializability in which three transactions T1, T2, and T3 will be processed will now be discussed.

That is, let schedules for T1, T2, and T3 be represented by the following equations respectively:

$$T1 = L1(a)U1(a)L1(c)U1(c)$$

$$T2 = L2(b)U2(b)L2(a)U2(a)$$

$$T3 = L3(b)L3(c)U3(c)U3(b)$$

As a result of concurrently processing the schedules of the above three transactions, we presume that the next two different transaction schedules, Ta and Tb are obtained.

$$\begin{aligned}Ta \;=\; & L1(a)L2(b)U2(b)L3(b) \\ & L3(c)U1(a)L2(a)U3(c) \\ & U2(a)L1(c)U1(c)U3(b)\end{aligned}$$

$$\begin{aligned}Tb \;=\; & L2(b)L1(a)U2(b)U1(a) \\ & L3(b)L1(c)L2(a)U1(c) \\ & L3(c)U3(c)U2(a)U3(b)\end{aligned}$$

When the above schedules are drawn with a directed graph in accordance with the judgement rules 1, 2, and 3, Ta falls on a closed-loop as shown in FIG. 6, and therefor serializability has failed. Meanwhile, Tb falls on an open loop as shown in FIG. 7 with serializability established.

This closed loop detection algorithm based on a lock model can judge the serializability but is not a suitable judging method, for example, in a distributed data base management system. This is because such a processing mechanism is constantly recognizing all transactions sequences of a distributed data base and concentrically monitoring a loop formation of the graph is required in itself.

(3) A 2-phase lock as one of the lock models

A 2-phase lock is used to ensures a serializability of the entire transaction sequences of a distributed data-base-management-system (D-DBMS), in which a concentrated monitoring mechanism required in a serializability judgement based on a general lock model is eliminated with some access rule for a data base file. In the 2-phase lock regulations, schedules in a transaction are completely separated into a group of lock procedures and a group of unlock procedures. In the former procedures, only lock operations are executed, while in the latter procedures, only unlock operations are executed. That is, after lock operations are completed in a transaction any lock operations is not performed in the same transaction thereafter. A scheduled of a transaction Ti according to the rule of 2-phase lock is represented by the following equation:

$$Ti = L1(\alpha) \cdot Li(\alpha) \cdots U1(\alpha) \cdot Ui(\alpha)$$

(where Li($\alpha$) is a lock phase and Ui($\alpha$) is an unlock phase.)

A serializability is successfull for any ensemble of transaction schedules excuted in accordance with the 2-phase lock rule. Assume that a closed loop should be formed in a graph for serializability judgement when some part of the schedule is excuted. As is apparent from FIG. 8, in a route directed from Vi to Vj, Ti is in an unlock phase with respect to processing unit data (a). Mean while, in a route directed from a transaction aggregation {T1, T2, ..., $\overline{Ti}$, $\overline{Tj}$, ..., $\overline{Tm}$} ($\overline{Ti}$ and $\overline{Tj}$ means that transactions Ti and Tj are removed from the transaction aggregation (T1, T2, ..., Ti, Tj, ..., Tm). That is {T1, T2, ..., Ti-1, Ti, Tj, Tj+i. ..., Tm} = {T1, T2 ..., Ti-1, Tj+1, ..., Tm}) to Vi, Ti is in a lock phase with respect to processing unit data (c). That the lock and unlock phases are simultaneously encountered conflicts with the preposition that the transaction aggregation {T1, T2·Tm} is executed in accordance with the 2-phase clock rule.

The above proof of serializability of transactions in the 2-phase lock rule is made for a concentrated data-base-management-system (C-DBMS). This proof, however, is applicable for a distributed data-base-management-system (D-DBMS). This is because the proof presupposes whether a specific CPU (WS) in which the transaction aggregation {T1, T2, ..., Tm} resides nor a specific CPU (WS) data base in which unit data aggregation {a, b, ... } resides.

(4) A problem of dead lock caused by a 2-phase lock

As described above, when the file lock and unlock declarations are made in accordance with the 2-phase lock rule, serializability of data is assured. A dead lock, however, is sometimes encountered as follows. For examples, let transactions T1 and T2 be represented by the following equations:

$$T1 = L1(a)L1(b)U1(a)U1(b)$$

$$T2 = L2(b)L2(a)U2(a)U2(b)$$

Assume that a schedule obtained by concurrently processing two transactions T1 and T2 is executed in the sequence of L1(a), and then L2(b), and so on. Since the transactions T1 and T2 have already occupied data to be occupied by each other in the next step (procedure step), neither the transactions T1 nor T2 can advance to the next step (procedure step). As a result, a so-called "dead lock" occurs.

Since a dead lock sometimes occurs in a serializability based on a 2-phase lock, the following detection rules are used to detect the dead lock ① A directed graph is made for requesting a lock to a data which is locked by another transaction Ti. A node Vi of the graph corresponds to the transaction Ti.

② When a transaction Tj issues a lock requesting to data a which is locked by the transaction Ti, a direction arrow a directed from Vj to Vi is given.

③ The above operation is repeatedly performed to generate all possible direction arrows in the graph.

④ In the graph obtained by performing the above operation, it is obvious that nonformation of a closed loop and nonoccurrence of a dead lock are equivalent conditions.

FIG. 9 shows a directed graph obtained when a dead lock based on the above detection rules ①, ②, ③, and ④ is generated.

When a dead lock is detected in the process such as the above sequence, a so-called "roll back procedure" is performed. That is, one of the transactions relating to generation of a closed loop is selected to go back (return) to the last executed producer or any other producer executed before the last, with the requesting producer canceled. Thereafter, the schedule is executed once more after some predetermined delay time. This method, however, for the following reasons, is not suitable for the distributed data-base-management-system (D-DBMS) discussed in the present invention. That is, (i) a delay time used in the roll back procedure is not solely determined. If an extremely short time is set as a delay time, a number of executions of the roll back procedure is required, and a transmission overhead between CPUs (WSs) increases accordingly. As a result, the performance of the system is largely degraded.

(ii) If dead locks are generated at a plurality of schedule execution points or places, the roll back procedure must be sequentially executed for the respective points. As a result, a procedure algorithm becomes very complicated.

(5) A time stamp method for eliminating generation of a dead lock and a roll back procedure Various methods have been proposed to eliminate the above drawbacks. Of these methods, a so-called time stamp method in which a time is stored during a transaction procedure will be described. Dead lock judgement references as an algorithm of the time stamp method will be briefly described below.

a. Assume that an aggregation of resources required by a certain transaction T1 is R1.

b. Assume that there is a dead lock generated between the resource R1 and resources R2 required by the transaction T2, if another transaction T2 requests a procedure start before the transaction T1 starts its procedure, T2.

c. Information concerning the resource required by the transaction T1 is stored into an internal memory or the like. Thereafter, the procedure of the transaction T1 is started if the there is no longer the possibility that dead lock is generated between the resources R1 and R2.

With the above rules, no dead lock will be generated. Hence no roll back procedure need be executed. In order to establish the above algorithm, it is necessary to recognize the start time of a transaction and the common time for a distributed data base management system. For example, each CPU time is set to be 0 at the start-up of a system, CPU-No. is added to CPU time of a certain CPU (WS) when mutual transmission is performed, and a priority is added to the CPU-No. Then, a unique common time for the system is obtained. A combination of CPU time and a CPU-No. of each site is generally called "time stamp time".

The above algorithm of dead lock judgement references a, b, and c will be described in detail, as follows.

① Before the transaction T1 is started, R/W lock reservation is performed for all files to be accessed in the transaction T1. The information of this lock reservation is represented by:

{T1, Ts(T1), Fa, Fb, ... } where I is an identification code (ID) for a lock reservation requesting, T1 is a transaction T1, Ts(T1) is a time stamp of the transaction T1, and Fa, Fb, ... are all file names to be subjected to R/W in the transaction T1.

e,crc/2/ The CPU (WS), which accepts the R/W lock reservation registers, a requesting job name, and a time stamp in the reservation list () of the file of interest. That is, buffering of information of the requested resource is performed in this step.

e,crc/3/ Each job outputs a R/W lock request immediately before the file is actually accessed. At this time, lock information is represented as:

{J, T, F} where J is an ID of the lock request, T is a transaction for executing the lock request, and F is a file name for executing the lock request.

④ The CPU (WS), which accepts the lock request, determined whether it is possible that a dead lock is generated between the accepted request and the already issued lock request of the transaction. If NO, the CPC outputs a lock permission. If YES the CPC supplies a lock inhibition to a requesting source. The lock request is inhibited and registered, together with the requested transaction and the lock reservation time stamp time, in a R/W waiting list.

⑤ A job currently being locked outputs an unlock request, so that each file can be locked. Each time the file is rendered available, it extracts a transaction having the smallest lock request and the shortest time stamp time from the R/W waiting list, and then sends the transaction to the corresponding WS.

Therefore, the above method makes it impossible to generate a dead lock and unnecessary to execute the roll back procedure).

The judgement algorithm for determining whether or not it is possible that a dead lock is penetrated, will now be explained with reference to FIG. 10.

If a transaction T1 of a certain CPU (WS) outputs lock reservation information (to each CPU (WS)) (step S1), the CPU (WS) registers the lock reservation information on a reservation list (step S2). The CPU (WS) outputs file-accessed lock request information (to the CPU (WS)) (step S3). Thereafter, each CPU (WS) which receives the lock request information based on an ID code of lock requesting checks the R/W lock list included in its data base file (step S4), thereby checking whether or not the corresponding file is already lock-requested by another transaction (step S5). If YES, there is no possibility that a dead lock exists. Nevertheless a lock requesting is executed under the lock permission (in the next step) in FIG. 10. Therefore, the flow advances to step S6, and the lock request is registered in the R/W waiting lock list. Thereafter, a lock inhibition is sent to the lock requesting WS (step S7). If NO in step S5, a R/W lock reservation list already registered in a data base file is checked (step S8), thereby determining whether or not a transaction exists which has a smaller time stamp than that of the lock requesting transaction (that is, whether or not it is possible that a dead lock is generated for the lock requests of the two transactions) (step S9). If YES the flow returns to steps S6 and S7. If no, that is, the lock requesting transaction has the smallest time stamp, it is determined there is no possibility of generating a dead lock, and a lock permission is sent (step S10).

As can be evident, especially from steps 4 and 5, this algorithm is a process wherein the current lock request is abandoned if a lock reservation request is output by a transaction having a shorter time stamp time than that of a currently requesting transaction before a current lock request is output.

In the above algorithm, therefore, a lock waiting time is disadvantageously generated due to a redundancy when a lock transaction is executed, although a dead lock preventing function is achieved. Let up assume there are the following two transactions T1 and T2:

$$T1 = Ts(T1) \cdot L1(F1) \cdot \\ L1(F2) \cdot U1 \cdot (F1) \cdot \\ U1(F2)$$

$$T2 = Ts(T2) \cdot L2(F2) \cdot \\ L2(F1) \cdot U2(F1) \cdot \\ U2(F2)$$

where $Ts(\alpha)$ is a file lock reservation request having a time stamp time with respect to a transaction and a file, $Li(\alpha)$ is a lock request with respect to the file in the transaction, and $Ui(\alpha)$ is unlock of the file in the transaction.

Assume that an arithmetic controller (e.g., file manager) of a CPU receives the transactions T1 and T2 and forms a schedule represented by the following equation by concurrent processing:

$$T1 + T2 = Ts(T1) \cdot \\ Ts(T2) \cdot \\ L2(F2) \cdot L1(F1) \cdot \\ L2(F1) \cdot \\ L1(F2) \cdot \ldots$$

In the schedule concurrently proceeded as described above, assume that the time stamp time satisfies Ts (T1)<Ts (T2), that is, the time stamp time of the transaction T1 is shorter than that of the transaction T2. In this case, according to the dead lock prevention judgement algorithm shown in FIG. 10, the first lock request L2 (F2) of the concurrently proceeded transaction (T1+T2) is not processed but stored on the lock waiting reservation list. This is because a file lock reservation request is already output for the file F2 from the transaction T1 having a shorter time stamp time than that of the transaction T2.

This fact proves that the dead lock prevention judgement algorithm based on the time stamp method has a redundancy. Therefore, a demand has arisen for minimizing the redundancy of the judgement algorithm.

SUMMARY OF THE INVENTION

It is an object of the present invention to provide a dead lock preventing method for a data base system, capable of proceeding the serializability of data processing by using a 2-phase-lock model and, capable of minimizing the redundancy of the dead lock prevention algorithm for judging a possibility of generating a dead lock.

In order to achieve the above object, there is provided a dead lock preventing method for a data base system in which a plurality of work stations, each having a data base, are connected to a transmission route to prevent a dead lock from being generated when each of the work stations perform both a lock reservation request and a lock request thereby to access a data base file of a desired arbitrary work station. The data base system of each work station includes arithmetic control means, internal memory means (first memory means) having a file lock reservation list, a file lock transaction list, and a file lock transaction waiting list, and external memory means (second memory means) for forming a data base constituted by a plurality of files.

This dead lock preventing method for a data base system comprises a list judgement step and an aggregation judgment step. The list judgment step is performed to supply a lock permission or a lock inhibition to a specific transaction in accordance with whether another transaction is registered in the file lock transaction list and the file lock reservation list, when the arithmetic control means accepts the lock request after the specific work station outputs a lock reservation request from a certain transaction the aggregation judgement step for obtaining, when it is judged in the list judgement step that another transaction is registered not in the lock transaction list but in the file lock reservation list, transaction aggregations from the file clock reservation list and the file lock transaction list, and sequentially to determine whether the transaction aggregation of the file lock transaction list is a zero aggregation, thereby to give a lock permission or a lock dispermission to the certain transaction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIGS. 2A to 2C are directed graphs obtained when a dead lock is generated;

FIG. 3 is a schematic view showing an arrangement of a data base system according to a method of the present invention;

FIG. 10 is a flow chart for explaining a time stamp method.

DETAILED DESCRIPTION OF THE PREFERRED EMBODIMENTS

When a lock reservation request and a lock request are sequentially performed for the data base file of one of the work stations installed in a network, it must be determined whether it is possible that a dead lock is generated, in order to prevent a dead lock. The principle of the present invention, which is a method of determining the possibility, will be described, with reference to FIG. 1 and FIGS. 2A to 2C.

Figure 1:
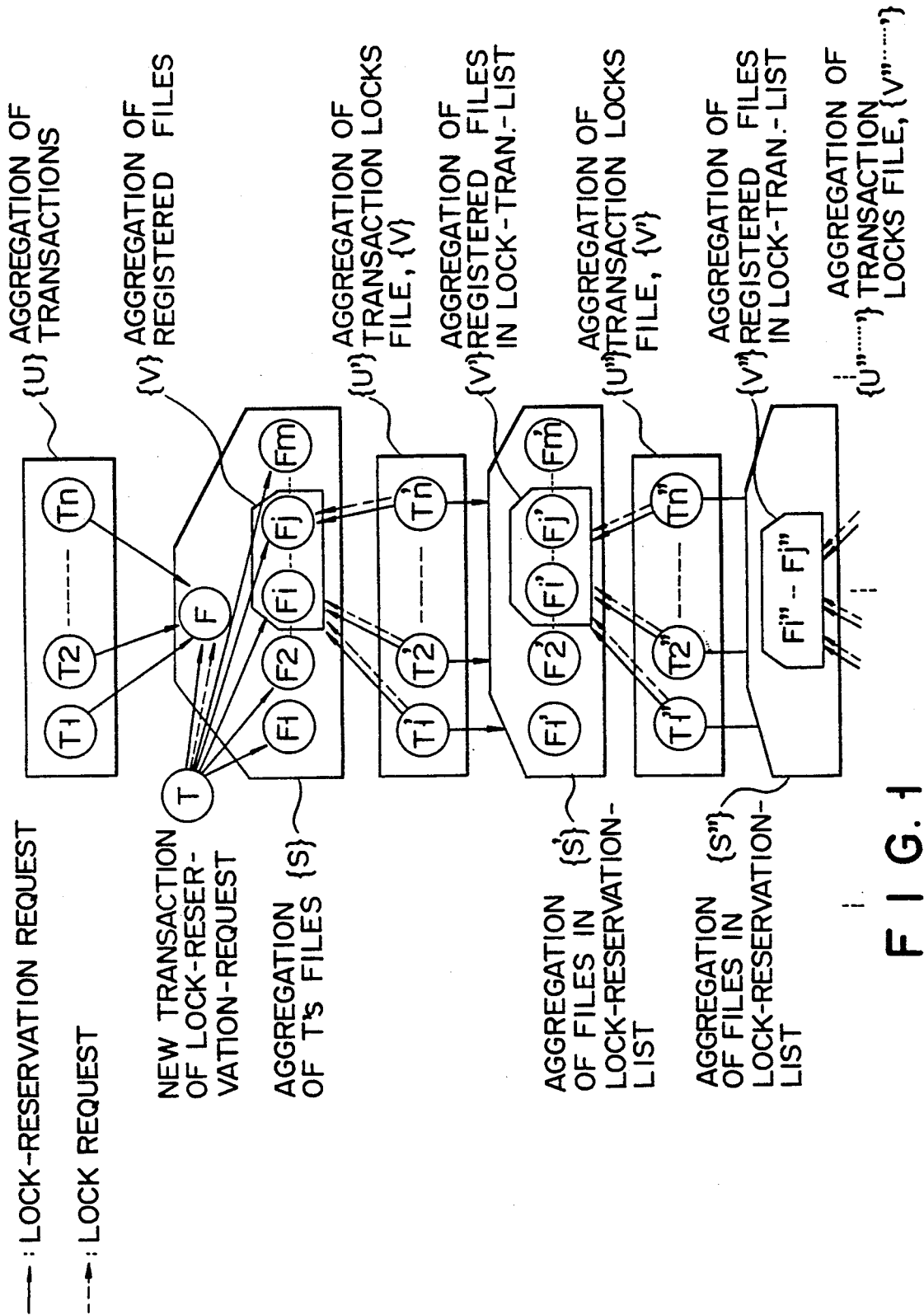
FIG. 1 is a schematic view for explaining a basic principle for judging a possibility of generating a dead lock.

FIG. 1 is a schematic view showing the principle of judging whether or not a dead lock is generated between a large number of transactions, e.g., T1, T2, ... , already executing a lock request of a transaction T.

Referring to FIG. 1, T1, T2, ..., Tn, and T denote transactions currently executing a lock reservation (indicated by a solid line). Of these transactions, the transaction T is an arbitrary one which is apt to execute the latest lock request (indicated by a dotted line) with respect to a data base file F. That is, the file F is about to be subjected to the lock request from the transaction T.

$\{U\}$ denotes an aggregation of all transactions executing a lock reservation for the file F, except for the transaction T. The elements of the aggregation $\{U\}$ are represented by the following equation:

$$\{U\} = \{T1, T2, \ldots, Tn\}$$

$\{S\}$ denotes an aggregation of files subjected to the lock reservation of the transaction T. The elements of the aggregation $\{S\}$ are represented by the following equation:

$$\{S\} = \{F1, \ldots, Fi, \ldots, Fj, \ldots, Fn, \ldots, F\}$$

$\{V\}$ denotes an aggregation of those files of aggregation $\{S\}$ which have been registered in a file lock transaction list. The elements of the aggregation $\{V\}$ are represented by the following equation:

$$\{V\} = \{Fi, Fi+1, \ldots, F\}$$

$\{U'\}$ = denotes an aggregation of transactions locking the file aggregation $\{V\}$. The transaction T is excluded from $\{U'\}$. Constituting elements of the aggregation $\{V\}$ are represented by the following equation:

$$\{U'\} = \{T1', T2', \ldots, Tn'\}$$

$\{S'\}$ denotes an aggregation of files subjected to lock reservations of the transaction aggregation $\{U'\}$. The elements of the aggregation $\{S'\}$ are represented by the following equation:

$$\{S'\{=\{F1', F2', \ldots, Fi', \ldots, Fj', \ldots, Fm'\}$$

$\{V'\}$ = denotes an aggregation of those files of the aggregation $\{S'\}$ which have been registered in the file lock transaction list. The elements of the aggregation $\{V\}$ are represented by the following equation:

$$\{V'\} = \{Fi', Fi+1', \ldots, Fj'\}$$

$\{U''\}$ denotes an aggregation of transactions locking the file aggregation $\{V'\}$. The elements of the aggregation $\{V''\}$ are represented by the following equation:

$$\{U''\} = \{T1'', T2'', \ldots, Tn''\}$$

$\{S''\}$ denotes an aggregation of files subjected to the lock reservations of the transaction aggregation $\{U''\}$. The elements of the aggregation $\{S''\}$ are represented by the following equation:

$$\{S''\} = \{F1'', F2'', \ldots, Fi'', \ldots, Fj'', \ldots, Fn''\}$$

$\{V''\}$ denotes an aggregation of those files of the aggregation $\{S''\}$ which have been registered in the file lock transaction list. The elements of the aggregation $\{V''\}$ are represented by the following equation:

$$\{V''\} = \{Fi'', Fi+1'', \ldots, Fj''\}$$

$\{U'''\}$ denotes an aggregation of transactions locking the file aggregation $\{V''\}$. The elements of the aggregation $\{U'''\}$ are represented by the following equation:

$$\{U'''\} = \{T1''', T2''', \ldots, Tn'''\}$$

As is apparent from the above symbol explanation of the constituting elements, logic development continues for the transaction aggregation $\{U''' \ldots '\}$ until a zero aggregation (zero-set) is obtained. Note that the solid line in FIG. 1 indicates that a lock reservation is executed for a corresponding file, and the broken line indicates locking is executed for a corresponding file. From the above description, a possibility of a dead lock can be described as follows:

If sequences of transaction aggregations are represented by $\{U\}, \{U'\}, \{U''\}, \{U''' \ldots '\}$, no dead lock is generated when all of $\{U\} \cap \{U'\}, \{U\} \cap \{U''\}, \ldots, \{U\} \cap \{U''' \ldots '\}$ become zero aggregations. Therefore, a lock request by the transaction T for the data base file F can be permitted. That is, even if an execution schedule (processing step) of an arbitrary transaction of the transactions T1, T2, ..., Tn is performed after the transaction T locks the file F, no dead lock is generated. Note that $\cap$ represents a product of two aggregations,"

Therefore, in order to prove the above event, it suffices to prove the following proposition only:

If a dead lock is generated in a certain schedule (processing step) execution of the transactions T1, T2, ... Tn and T performed after the file F is locked by the transaction T, at least one of $\{U\} \cap \{U'\}, \{U\} \cap \{U''\}, \ldots, \{U\} \cap \{U''' \ldots, \}$ is not a zero aggregation."Generation of a dead lock is equivalent to formation of a closed loop in a directed graph for dead lock judgement.

The above proposition will be proved, with reference to FIGS. 2A to 2C showing directed graphs in which a dead lock is generated.

FIGS. 2A, 2B, and 2C show closed loops constituted by two, three, and n transactions, respectively. As shown in FIGS. 2A, 2B, and 2C, a dead lock is generated regardless of the number of transactions.

Assume that a dead lock is generated in an execution schedule of the transactions T1, T2, Tn and T performed after the transaction T locks the file F.

Also assume that a dead lock is generated among two transactions.

Referring to FIG. 2A, the transaction T locks the file F, and then tends to lock the file aggregation $\{V\}$ in subsequent schedule (sub-steps). Meanwhile, the transaction T1' has already locked a part of the file aggregation $\{V\}$ and then tends to lock the file F in a subsequent schedule (sub-steps). Therefore, if the schedules advance without any changes, a dead lock will be generated. That is, since the transaction T1' tends to lock the file F as is shown in FIG. 2A, the file F has already been subjected to a lock reservation, and $\{U\} \ni T'$ is obtained, where symbol $\ni$ means that a certain transaction element belongs to its aggregation. In addition, since the transaction T1' has already locked a file aggregation (or a part thereof), which the transaction T made a lock reservation for and will lock, $\{U\} \ni T1'$ is obtained. A relationship between $\{U\}$ and $\{U'\}$ is represented by the following equation:

$$\{U\} \cap \{U'\} \neq \phi$$

where $\phi$ is a zero aggregation, and $\cap$ is a product of the aggregation.

The above relationship is represented by a correlation map between a transaction aggregation and a file aggregation in $\{U\}, \{S\}, \{V\}, \{U'\}$ of FIG. 1.

Assume that a dead lock is generated among three transactions.

In this case, as is shown in FIG. 2B, the transaction T locks the file F and then tends to lock the file aggregation $\{V\}$ in a subsequent schedule. Meanwhile, the transaction T1'' has already locked a part of the file aggregation $\{V\}$ and tends to lock the file aggregation $\{V'\}$ in a subsequent schedule. Also, the transaction T2'' has already locked a part of the file aggregation $\{V'\}$ and then tends to lock the file F in a subsequent schedule. Therefore, if the schedules advance, a dead lock will be generated. That is, since the transaction T2'' tends to lock the file F, as is evident from FIG. 2B, the transaction T2'' has already made a lock reservation for the file F. This aggregation relationship is represented by $\{U\}$ T2'. The transaction T1'' has already locked the file aggregation $\{V\}$ (or a part thereof), which the transaction T made a lock reservation for and will lock, and tends to lock the aggregation $\{V\}$ (or a part thereof) already locked by the transaction T2''. Therefore, an aggregation relationship is represented by $\{U''\} \ni T2''$ in accordance with the definition of the aggregation U''. Therefore, a relationship between $\{U\}$, and $\{U''\}$ is represented by the following equation:

$$\{U\} \cap \{U''\} \neq \phi \text{ (i.e., a zero aggregation)}$$

This correlation is indicated in $\{U\}, \{S\}, \{V\}, \{U'\}, \{S'\}, \{V'\}, \{U''\}$ of FIG. 1.

Assume that a dead lock is generated among n+1 transactions.

This being the case, the transaction T locks the file F and then tends to lock the file aggregation $\{V\}$ in a subsequent schedule, as is shown in FIG. 2C. The transaction T1''. . . , has already locked a part of the file aggregation $\{V\}$ and tends to lock the file aggregation $\{V\}$ in a subsequent schedule. Meanwhile, the transaction Tn''. . . ' has already locked a part of the file aggregation $\{V'''. . . '\}$ and then tends to lock the file F in a subsequent schedule. Therefore, if the schedules advance without any changes, a dead lock will be generated. Assume that a dead lock is generated in schedule execution of the transactions T1, T2, . . . , Tn and T performed after the transaction T locks the file F. Then, a relationship between $\{U\}$ and $\{U'''. . . '\}$ is represented by the following equation as in the cases shown in FIGS. 2A and 2B:

$$\{U\} \cap \{U'''. . . '\} \neq \phi$$

Therefore, it is proved from the above description that the judgement reference of a possibility of generating dead lock is true.

FIG. 3 shows a schematic representation of a distributed data base management system, to which the method of the present invention is applied. This system comprises work stations (WSs) $12_1, 12_2, \ldots, 12_i$ are distributed on a transmission route 11 such as a LAN, and data base files $13_1, 13_2, 13_i$ connected to the WSs $12_1, 12_2, \ldots, 12_i$, respectively. Each WS can access (query/update) data bases of the other WSs. (Note that, in FIG. 3, solid lines 14a and 14b indicate routes for file lock reservation, and broken lines 15a and 15b indicate routes for file lock.) As the solid and broken lines with arrowheads indicate, the WS $12_1$ performs a lock reservation and a lock request with respect to the WSs $12_i$ and 12, for the corresponding files. Similarly, the WS 12 performs a lock reservation and a lock request with respect to the WSs $12_1$ and $12_2$, for the corresponding files. Since the data base file $13_2$ belonging to the WS $12_2$ is thus subjected to file lock reservations and file locks by a plurality of WSs $12_1$ and $12_i$, a dead lock may be generated.

Figure 5:
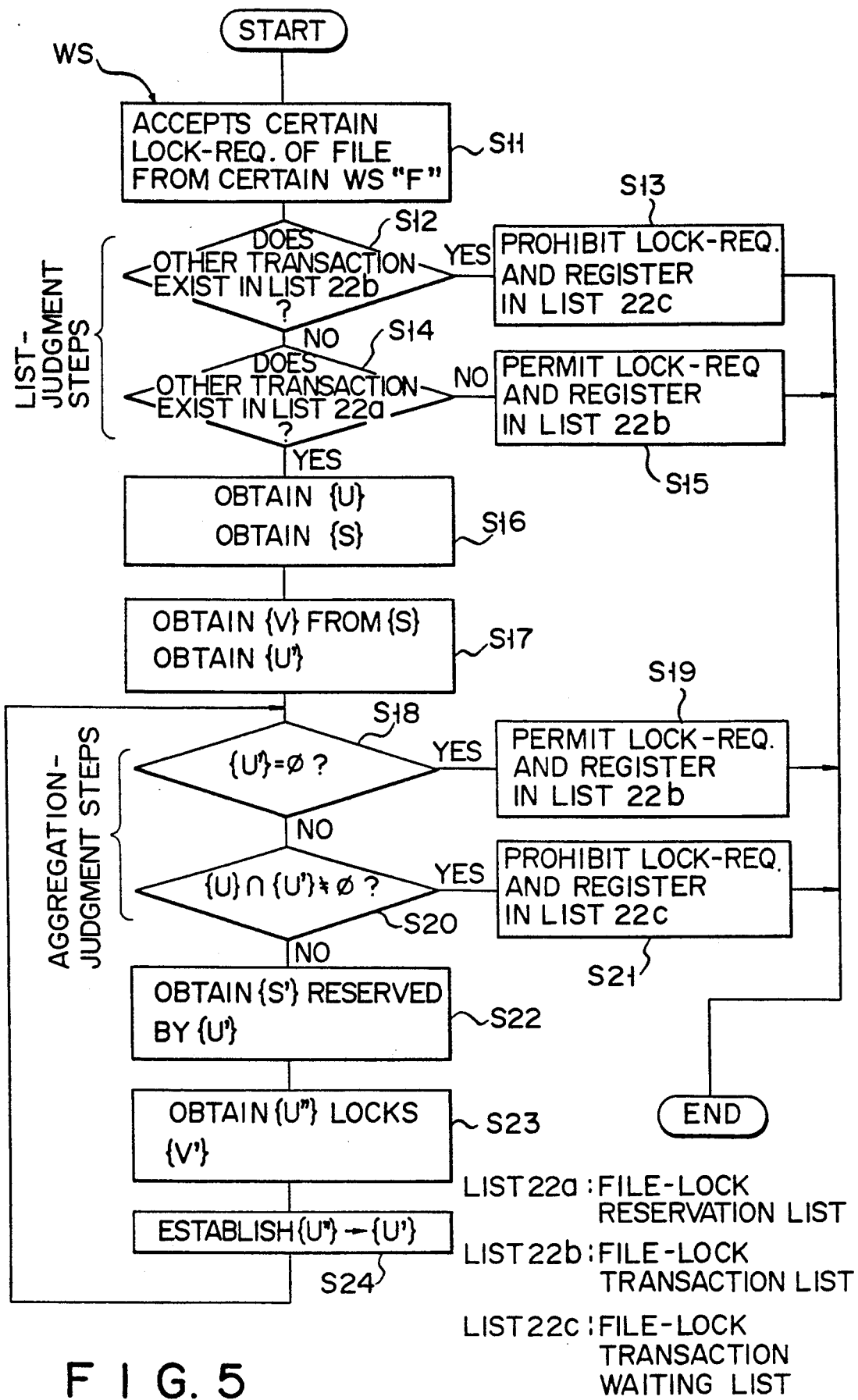
FIG. 5 is a flow chart for explaining a main part of the method of the present invention.
Figure 6:
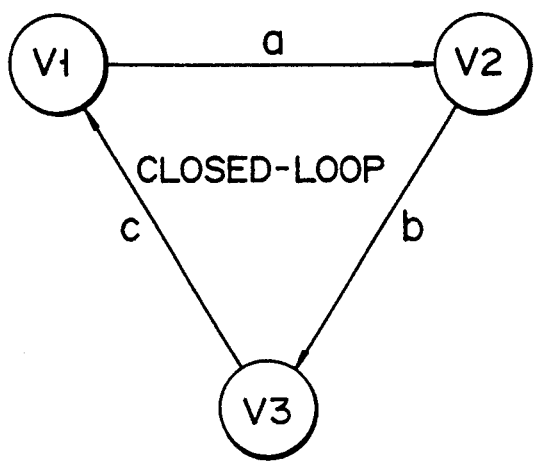
FIG. 6 is a directed graph obtained when serialization control is not established.
Figure 7:
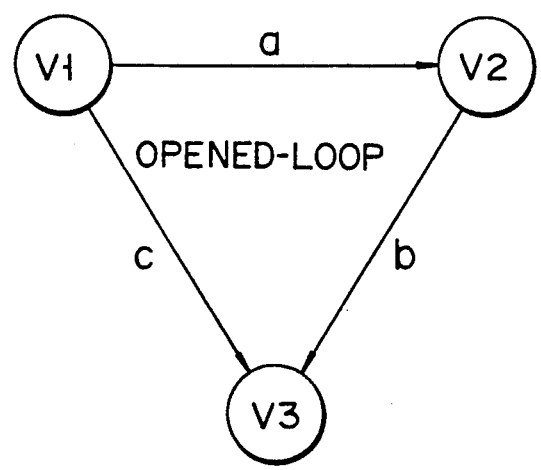
FIG. 7 is a directed graph obtained when serialization control is established.
Figure 8:
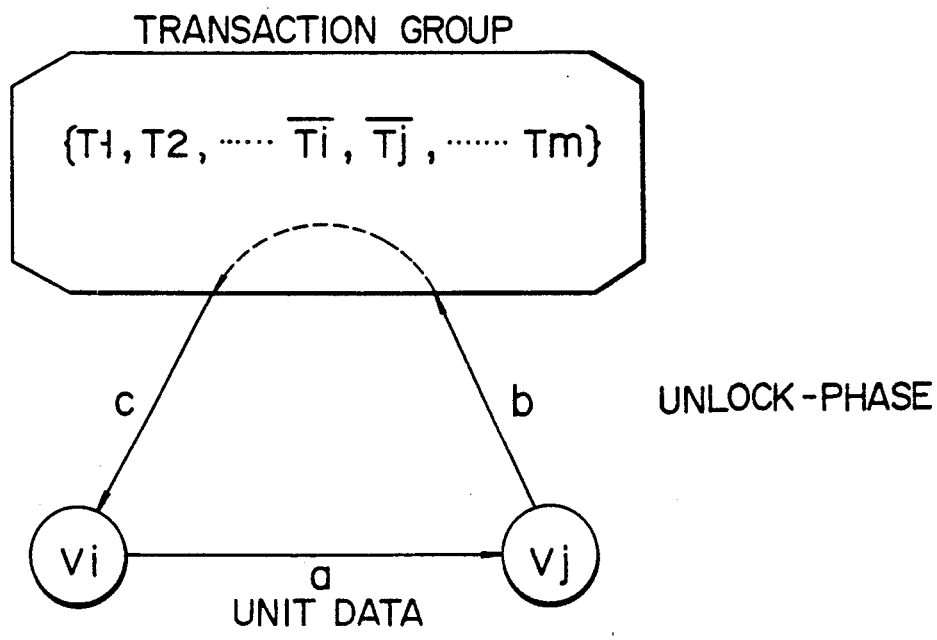
FIG. 8 is a view for explaining sufficient and necessary conditions for establishing serializability control by 2-phase lock rules.
Figure 9:
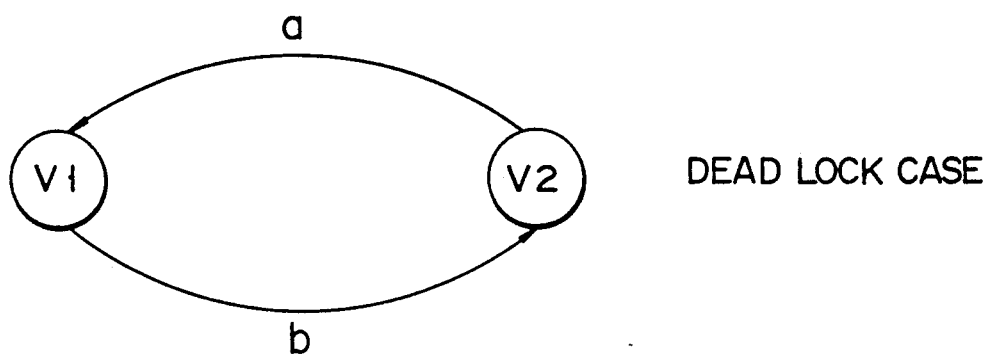
FIG. 9 is a directed graph obtained when a dead lock is generated.

Each of the WSs $12_1, 12_2, \ldots, 12_i$ includes an arithmetic control unit 21, called "a file manager", for executing an algorithm, as is shown in the flow chart of FIG. 5, and a memory 22 constituted by a file lock reservation list 21, a file lock reservation list 22a, a file lock transaction list 22b, and a file lock transaction waiting list 22c. The WSs $12_1, 12_2, \ldots, 12_i$ are connected to the arithmetic control unit 21 of the WS 12 by the transmission route 11 of the LAN, as has been described above. A data base file 13 is connected to the arithmetic control unit (CPU) 21, like the data base files $13_1, \ldots, 13_2, \ldots, 13_i$. In addition, the transactions T1, T2, . . . , T, . . . , Tn send a file lock reservation request (indicated by a solid line) and a file lock request/file unlock request (indicated by a broken line) to the arithmetic control unit 21 from not only the WS 12 but also other WSs $12_1, 12_2, \ldots 12_i$ via the transmission route 11. The arithmetic control unit (CPU) 21 sends a file lock permission response/file lock inhibition response) (indicated by an alternate long and short dashed line) to the transactions T1, T2, . . . , T, Tn.

Figure 4:
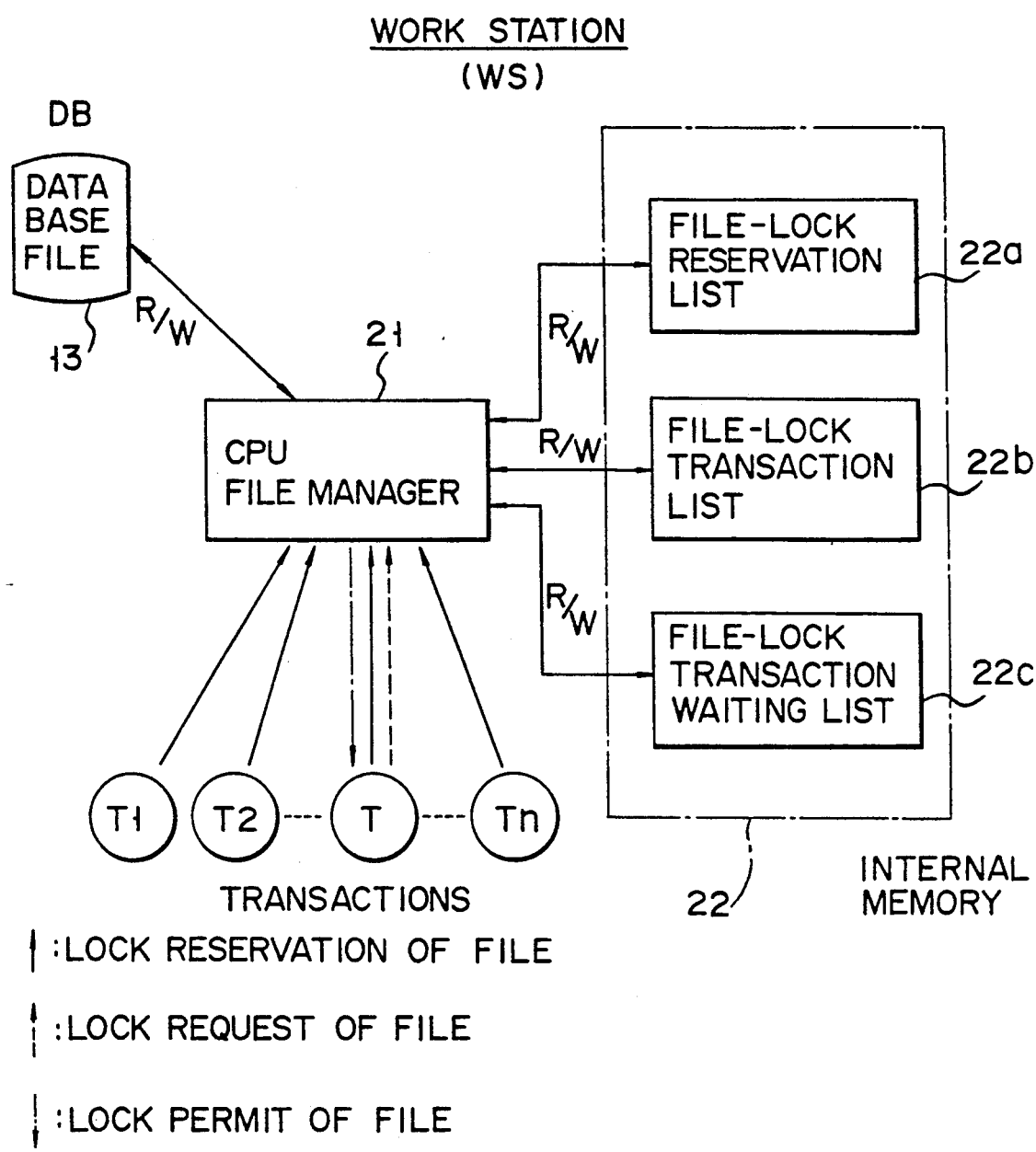
FIG. 4 is a view showing an arrangement of hardware for explaining the method of the present invention.

An operation of the system according to the method of the present invention will now be described, with reference to FIG. 4.

The transaction T, which tends to access a certain data base file, issues a file lock reservation (solid line) to files (not shown) to be accessed. The arithmetic control unit (CPU) 21 receives a lock reservation request from one of the transactions, and registers the files in the file lock reservation list 22a. Subsequently, when the transaction T issues a file lock request (dotted line), the arithmetic control unit 21 receives the file lock request. The unit 21 determines whether a lock is permitted or not, using the algorithm shown in FIG. 5 (described later). If YES, the unit 21 registers the file name in the file lock transaction list 22b and informs the transaction T of the lock permission (see the alternate long and short dashed line).

If NO, the unit 21 registers the file name in the file lock transaction waiting list 22c and informs the transaction T of the lock inhibition (see the alternate long and short dashed line). Thereafter, the transaction T remains in a waiting status until it receives information representing a lock permission.

Each time the contents of the file lock transaction list 22b are updated, the arithmetic control unit (CPU) 21 searches file lock transaction waiting list 22c, picks up the file name therefrom, and determines whether or not a lock is permitted. If YES the unit 21 copies a corresponding file name from the file lock transaction waiting list 22c and copies it into the file lock transaction list 22b, and then informs the transaction T of the lock permission.

When all the files are completely accessed, the transactions T1, T2, ..., Tn send file unlock requests. At this time, the arithmetic control unit (CPU) 21 deletes the corresponding file names from the file lock reservation list 22a, and also the corresponding file names from the file lock transaction list 22b.

A judgement process of lock permission or lock inhibition with respect to the lock request will now be described, with reference to the flowchart shown in FIG. 5.

When the transaction T sends a file lock reservation to an arithmetic control unit 21 of a work station having the files to be accessed, the unit 21 receives the lock reservation request and registers it in the file lock reservation list 22a. Thereafter, the transaction T executes a lock request for the file F, made to the unit 21 (step S11).

When the arithmetic control unit 21 receives the lock request from the transaction T made to the file F, it checks whether or not a transaction other than the transaction T is already registered in the file lock transaction list 22b with respect to the file F (step S12) (1st list judgement step).

If YES, the flow advances to step S13.

In step S13, the unit 21 prohibits the lock request and stores it in the file lock transaction waiting list 22c. If NO in step S12, the unit 21 determines again whether or not a transaction other than the transaction T is registered in the file lock reservation list 22a (step S14, i.e., 2nd list judgement step).

If NO in step S14, the unit 21 gives lock permission to the transaction T and registers the lock request of the transaction T in the file lock transaction list 22b (step S15).

If YES in step S14, the unit 21 obtains the transaction aggregate $\{U\}$ already executing lock reservations for the file F and the file aggregation $\{S\}$ already subjected to a lock reservation of the transaction T (step S16).

Thereafter, the unit 21 obtains the file aggregation $\{V\}$ of the file aggregation $\{S\}$ already registered in the file lock transaction list 22b, and obtains also the transaction aggregation $\{U'\}$ locking the file aggregation $\{V'\}$ (step S17).

Thereafter, the flow (execution step) advances to step S18. In step S18, the unit 21 determines whether or not the transaction aggregation $\{U'\}$ is a zero aggregation or not (1st zero aggregation (zero-set) judgement step). If YES, the flow advances to step S19, in which the unit 21 informs the transaction T of a lock request and registers it in the file lock transaction list 22b (step S19).

If NO in step S18, the unit 21 then determines whether or not $\{U\} \cap \{U'\}$ is a zero aggregation (step S20, i.e., 2nd zero aggregation zero-set judgement step).

If NO in step S20, the unit 21 is controlled by the closed loop pattern shown in FIG. 2B, informs the transaction T of lock request dispermission, and registers the transaction T in the file lock transaction waiting list 22c (step S21).

If YES in step S20, the flow advances to step S22. In step S22, the unit 21 obtains the file aggregation $\{S'\}$ subjected to lock reservation by the transaction aggregation $\{U'\}$.

The flow then advances to step S23. In this step, the arithmetic control unit 21 obtains the file aggregation $\{V\}$ of the file aggregation $\{S\}$ already registered in the file lock transaction list 22b, and obtains also the transaction aggregation $\{U''\}$ locking the file aggregation $\{V\}$ (step S23). Then $\{U'\}$ is substituted by $\{U''\}$ in step S24. The flow then returns to step S18, whereby similar zero aggregation judgement steps will be performed.

The dead lock preventing method of the present invention is characterized by the aggregation judgement steps for determining the presence/absence or possibility of a zero aggregation, which are performed along with the list judgement steps executed in the described above order. Hence, the logic flow of a (judgement processing) operation shown in FIG. 5 is equivalent to the judgement step of the presence/absence of a closed loop in each of the directed graphs shown in FIGS. 2A to 2C.

Therefore, if both the execution transactions T1 and T2 tend to lock the files F1 and F2, for example, and if a lock reservation time stamp satisfies a relation of Ts (T1) < Ts (T2), the execution schedules (processing steps) of the transactions T1 and T2 are:

$$T1 = Ts(T1) \cdot L1(F1) \cdot L1(F2) \cdot U1(F1) \cdot U1(F2)$$

$$T2 = Ts(T2) \cdot L2(F2), L2(F1) \cdot U2(F2) \cdot U2(F2)$$

and the merged schedule (union processing steps) preceded the transactions T1 and T2 concurrently by the arithmetic control unit is:

$$T1 + T2 = Ts(T1) \cdot Ts(T2) \cdot L2(F2) \cdot L1(F1) \cdot L2(F1) \cdot L1(F2)$$

In the time stamp method, a relation of Ts (T2) < Ts (T2) is satisfied. Therefore, L2 (F2) is not permitted. That is, the transaction T2 cannot lock the file F2, because the transaction Ta having a smaller time stamp already finishes a lock reservation though the transaction T2 tends to lock the file F2.

In contrast, in the method of the present invention, the transaction T2 can lock the file F2. This is because the transaction aggregation $\{U\}$ is a zero aggregation as it is represented by $\{U'\}=\phi$ although the transaction T1 has made a lock reservation. The transaction T1, however, cannot lock the file F2, because $\{U\} \ni T2$ and $\{U'\} \ni T2$, i.e., the transaction T2 makes a lock reservation of the file F2 and locks the file F2. Therefore, even in a schedule after the above series of processing steps, by performing similar processing by a similar order, a file of a data base can be accessed regardless of a stamp time without generating a dead lock.

The embodiment described thus far is, a distributed data base management system has been described. The present invention, however, can be applied to a system other than the distributed type. In addition, the present invention can be variously modified and carried out without departing from the spirit and scope of the present invention. As has been described in detail, according to the present invention, a user can access a data base file by using a comparatively simple algorithm within a short lock waiting time, while a dead lock is reliably prevented. In other words, the invention provides a dead lock preventing method for a data base system, which realizes a file update serializability control.

Additional advantages and modifications will readily occur to those skilled in the art. Therefore, the invention in its broader aspects is not limited to the specific details, and illustrated examples shown and described herein. Accordingly, various modifications may by without departing from the spirit or scope of the general inventive concept as defined by the appended claims and their equivalents.

What is claimed is:

1. A method for preventing dead lock in a data base system having a plurality of files and workstations, comprising the steps of:
    issuing, for one of said files, F, a file lock reservation request by a transaction, T, of one of said workstations, W;
    determining, by W, if another of said workstations has locked F;
    prohibiting, by a control means within W, said file lock reservation request if said step of determining if another of said workstations has locked F has determined that another of said workstations has locked F;
    determining, by W, if another of said workstations has reserved F;
    permitting, by said control means within W, said file lock reservation request if said step of determining if another of said workstations, has reserved F and said step of determining if another of said workstations has locked F have determined that F has not been reserved and not locked by another of said workstations, otherwise not permitting said file lock reservation request; and
    performing, if said step of permitting said file lock reservation request does not permit said file lock reservation request, the following steps:
    obtaining an aggregation {S} which includes files subject to the file lock reservation request of said transaction T;
    obtaining an aggregation {V} which includes the files of the aggregation {S} which have been registered in a file lock transaction list;
    obtaining an aggregation {U'} including transactions locking the file aggregation {V};
    determining if {U'} is a zero aggregation; and
    permitting said file lock reservation request if{U'} is determined to be a zero aggregation;
    wherein when said filed lock reservation request is permitted by either of said permitting steps, said file lock reservation request is registered in the file lock transaction list.

2. A method for preventing dead lock in a data base according to claim 1, further comprising the steps:
    registering, when said file lock reservation request has been permitted, the name of the file, F, which has been permitted to be locked in a file lock transaction list and informing the transaction T, that the file lock reservation request has been permitted; and
    registering, when said file lock request has been prohibited, F, in a file lock transaction waiting list and informing said transaction T, of the prohibition of said file lock reservation request.

3. A method for preventing dead lock in a data base system according to claim 1, further comprising the step:
    obtaining, whenever a lock status of a file is changed, a file name from a file lock transaction waiting list and repeating the process for preventing a dead lock in a data base system to determine if a file lock should be permitted or prohibited for the file having the changed status.

4. A method for preventing a dead lock in a data base system according to claim 1, further comprising the steps of:
    obtaining an aggregation $\{U\}$ which includes transactions of said plurality of workstations executing a file lock reservation request for F, except for said transaction T;
    determining, if $\{U'\}$ is determined to be a zero aggregation, if $\{U\} \cap \{U'\}$ is not a member of the zero aggregate; and
    prohibiting said file lock reservation request if $\{U\} \cap \{U'\}$ is determined not to be a member of the zero aggregate.

5. A method for preventing dead lock in a data base system having a plurality of files and a plurality of workstations, comprising the steps:
    issuing, for one of said files, F, a file lock reservation request by a transaction, T, of one of said workstations, W;
    determining, by W, if another of said workstations has locked F;
    prohibiting, by a control means within W, said file lock reservation request if said step of determining if another of said work station has locked F has determined that another of said workstations has locked F;
    determining, by W, if another of said workstations has reserved F;
    permitting, by said control means within W, said file lock reservation request if said step of determining if another of said workstations has reserved F and said step of determining if another of said work stations has locked F have determined that said file has not been reserved and not locked by another of said workstations, otherwise not permitting said file lock reservation request; and
    performing, if said step of permitting said file lock reservation request does not permit said file lock reservation request, the following steps:
    obtaining an aggregation {U} containing an aggregation of all transactions executing a file lock reservation request for F, except for said transaction T;
    obtaining an aggregation {S} which includes files subject to said file lock reservation request of said transaction T;
    obtaining an aggregation {V} which includes files of {S} registered in a file lock transaction list;

obtaining an aggregation $\{U'\}$ including transactions locking $\{V\}$;

determining if $\{U'\}$ is a member of the zero aggregate;

if $\{U'\}$ is determined to be a member of the zero aggregate, permitting said file lock reservation request;

determining if $\{U\} \cap \{U'\}$ is not a member of the zero aggregate;

if $\{U\} \cap \{U'\}$ has not been determined to be a member of the zero aggregate, prohibiting said file lock reservation request;

obtaining a file aggregate $\{S'\}$ containing file lock reservation requests of $\{U'\}$;

obtaining a file aggregate $\{V'\}$ containing files of $\{S'\}$ which are locked;

obtaining a file aggregate $\{U''\}$ containing an aggregation of transactions locking files of $\{V'\}$;

setting $\{U'\}$ equal to $\{U''\}$;

repeating the step of determining if $\{U'\}$ is equal to the zero aggregate and steps thereafter until said file lock reservation request is permitted or prohibited;

wherein when said filed lock reservation request is permitted by either of said permitting steps, said file lock reservation request is registered in the file lock transaction list.

6. A method for preventing a dead lock in a data base according to claim 5, further comprising the steps:

registering said file lock reservation request in a file lock transaction list when said file lock reservation request is prohibited; and registering said file lock reservation request in a file lock transaction waiting list when said file lock reservation request is prohibited.

7. A method for preventing a dead lock in a data base system according to claim 6, further comprising the steps:

issuing other file lock reservation requests and storing said other file lock reservation requests in a file lock reservation list and sequentially determining, for each of said other file lock reservation requests stored in said file lock reservation list, if each of said other said file lock reservation requests should be prohibited or permitted said method for preventing dead lock in a data base system.

* * * * *